INVENTOR
Richard L. Avery
ATTORNEY

United States Patent Office 3,021,752
Patented Feb. 20, 1962

3,021,752
IMAGE STABILIZER AND DIMMER FOR
OPTICAL DEVICES
Richard L. Avery, Baltimore, Md.
(319 N. Yale, Wichita 8, Kans.)
Filed Oct. 23, 1959, Ser. No. 848,245
2 Claims. (Cl. 88—32)

The present invention relates to an image stabilizer for use in conjunction with optical instruments, and particularly, in conjunction with telescopes of the type used in celestial and terrestrial viewing, such as transits, levels, gunsight telescopes, periscopes, range finders, binocular telescopes, celestial telescopes, etc.

A common problem with many optical devices is presented by the fact that the index of refraction of the earth's atmosphere is not the same in all portions of the atmosphere, but varies, particularly with differences in temperature. This problem is particularly troublesome when the atmosphere is turbulent, though it is not completely absent at any time.

It is an object of this invention to provide periodic interruption of the light rays traversing the image plane of a telescope or other optical device by means of a shuttering device, in such a manner that, in conjunction with the well known phenomenon whereby an image falling on the retina of the human eye persists for a short period of time after the source of the image has been removed, a non-flickering image is perceived by the eye, which has shimmer greatly reduced.

A further object of my invention is the provision of an apparatus which, when used with known types of optical devices will greatly reduce shimmer and "poor seeing," and will thereby greatly increase the accuracy and utility of such optical devices.

A further object of this invention is the provision, near the image plane of an optical device, and parallel to such image plane, of a motor-driven revolving disk, having sector-shaped sections removed, thereby providing periodic interruption of the image received by the viewer.

A still further object of my invention is the provision of a shutter of regular periodicity in close proximity to the image plane of an optical device, which has a dimming effect of sufficient magnitude to permit the use of an optical device of high resolving power for observation of a relatively brilliant object such as the moon, with improved conditions of comfort and lessened strain, for the viewer.

Other objects and advantages of my invention will be apparent from the following description, and accompanying drawings, in which similar reference characters indicate similar parts throughout the several views.

Figure 1:
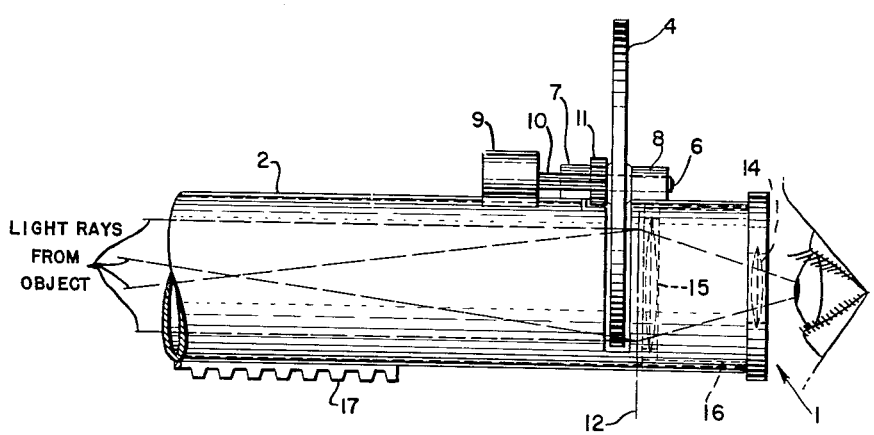
FIGURE 1 is an elevational view of one form of my invention, showing my apparatus mounted upon the focusing tube of a telescope, or other such optical device.
Figure 2:
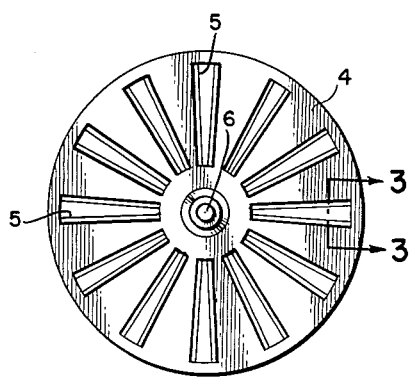
FIGURE 2 is a plan view of the shutter disk portion of a preferred form of my invention.

Sir Isaac Newton was possibly the first person to suggest a remedy for the very troublesome shimmer which all astronomers and surveyors know. He said that celestial telescopes should be set up on high places, " . . . for the air through which we look at the stars is in perpetual tremor, as may be seen by the tremulous motion of shadows cast from high towers and by the twinkling of fix'd stars . . . . The only remedy is a most serene and quiet air such as may perhaps be found on the tops of the highest mountains above the grosser clouds."

Shimmer, of course, is caused by the fact that the light rays which are collected by a telescope pass through a fluid medium, air usually, or water occasionally, before entering the telescope. Some refraction takes place in this passage, and the magnitude of this refraction varies with differences in temperature or density of the fluid medium. Therefore, when zones, or layers, of the fluid medium, having different temperatures come in contact with one another, local turbulences are produced throughout the zones of mixing, which local turbulences will contain discrete portions of fluid medium of relatively widely varying indices of refraction. Objects observed through these local turbulences by means of a telescope, or with the unaided eye, will appear to shimmer, or break up into fragments, or twinkle. In many types of optical observations, this problem is quite troublesome. Thus, surveyors seeking to establish a direction or distance with a transit, or with a level, will have difficulty making the observation, particularly on a windy day when zones of air of differing temperatures are intermixed strongly, or when an observation is made over a long distance, the difficulty being caused by the observed target appearing to fragment or dance about. Or, as another example, a marksman using a telescopic optical gunsight over a great distance will have similar difficulty. Or astronomers, in mapping or observing details of the moon's surface, will have considerable trouble, particularly under turbulent air conditions, in making such observations accurately, due to this shimmering effect.

I have discovered that a practical means may be used to substantially reduce shimmer or, as it is known to astronomers, "poor seeing."

This consists in shutting out the observed image for a proportion of the time that it is being viewed, and at the same time, taking advantage of image persistence on the retina of the eye so as to give an apparently continuously observed image, without apparent flicker, and with a great deal less shimmer.

Image persistence, the well known phenomenon whereby an image does not disappear immediately from the retina, upon the source of the image being shut off from the observer, is of a character such that if a viewed object is alternately observed and cut off from view at from 20 to 50 times per second (as a lower limit, depending on physical and physiological, and possibly psychological factors), there will not be any observable flickering of the observed object. This phenomenon, of course, is the basis of motion picture photography and projection, whereby individual picture frames are projected on the projection screen for approximately one-thirtieth of a second each, giving the appearance of continuous motion without flicker, while, if the projector is slowed so that the "blanked-out" period of time between frames is more than 1/20 second, there is readily observable flicker. The upper limit of this recurring "blanked-out" period of time, in a periodically opening and closing shutter, or in a "sweep" form of shuttering device such as is described hereinafter as a part of my invention, is referred to herein as the critical flicker frequency.

Refracting and reflecting telescopes, whether binocular, or monocular, whether for astronomical or terrestrial use, commonly (the principal exception being the Kellner-Schmidt optical system set forth in U.S. Patent No. 969,785) have an objective lens or mirror producing a real inverted image, plus an eyepiece lens which magnifies the image. Terrestrial telescopes, in addition, will have an image-erecting system; either a lens or a prism system. (I omit from consideration Galilean type telescopes—field glasses—in which a diverging-lens eye-piece is used, as it is not practical to place my periodic shutter near the image plane of the objective lens.) My invention consists placing a periodically-acting shutter of an opening and closing, or of a "sweep" type, adjacent, or at, the image plane of the objective lens of these telescopes.

By a "sweep" type shutter, I mean a device which alternately sweeps the light path, or the bundle of light rays, passing through it, with open and closed areas. That is, an opening sweeps across the light path, allowing portions of the light path through as the sweep occurs.

A preferred embodiment of my device is shown in the accompanying drawings. FIGURE 1 shows an eyepiece lens system 1 having lenses 14 and 15 mounted in mounting tube 16, and fitting into eyepiece tube 2 of a telescope or optical device of the types to which my invention is applicable. Focusing of the eyepiece lens system may be accomplished by sliding eyepiece tube 2 backward or forward axially in the telescope focusing tube not shown in which it has a sliding fit, and in which it may be adjusted backward and forward by, for example, a rack 17 and pinion (not shown). Rotating shutter disk 4 having a plurality of substantially sector-shaped openings 5, and shutter spindle 6, is mounted on eyepiece tube 2 by means of front and rear bearings 7 and 8 respectively, and is driven, for example, by electric drive motor 9 having drive gear 10 which coacts with driven gear 11 fixedly attached to shutter spindle 6. An important feature of my invention is the mounting of my shutter near to, or at, the image plane 12 of the objective lens (not shown) of the optical device on which it is used. It is essential that the shutter be close to or at the image plane. It may be pointed out that other rotating shutterlike devices are known to the art, whose primary function is to produce an effect other than the reduction of shimmer, and such devices are mounted elsewhere than near the image plane. For example, U.S. Patent 1,153,945 teaches the use of a rotating disk located forward of the objective lens of a telescope for the purpose of keeping rain off of the objective. Were my device located near to the objective lens, it would produce no noticeable reduction in shimmer, but only an indistinct dimming of the light reaching the observer's eye, for light entering the objective lens does not do so strictly in parallel rays, but in what may be considered a series of cones of small apex-angle (perhaps two degrees), infinite in number, and having the apexes distributed over the entire surface of the image plane. Thus, if a part of the light entering the objective lens is shut out—that is, if part of the end of the telescope is closed off, and part is left open—then the light entering the telescope through the open portion will be distributed over the entire image plane, and the effect will not be that of a partial image, but of a dimmed image. Therefore, if my device were located ahead of the objective lens, it would not periodically shut off all light rays reaching the image plane. Instead, a continuous flow of light would reach the image plane, the image would never be completely shut off from the actual view of the observer, and shimmer would not be reduced at all.

My shutter disk may be designed with any suitable number of openings 5, with the total angle of openings having a relationship to the concurrent dimming effect which is discussed below. The greater the number of openings, the slower the disk should be rotated to produce the desired shimmer reduction. A lower design limit on the speed of rotation for a disk with a given number of openings is imposed by the necessity of avoiding flicker, while an upper limit is presented by the requirement that, to reduce shimmer, the image must not be interrupted too frequently, as will also be discussed further below. Of course, as the number of slots is increased, the revolutions per minute of disk 5 may be reduced, and conversely, to get the same degree of shimmer reduction.

Figure 3:
FIGURE 3 is a cross sectional view along line 3—3 showing a profile of one of the slots of the shutter disk of FIGURE 2.

Preferably, the profile of the cross section of the slots, as shown in FIGURE 3, displays a trapezoidal shaped opening 13 to avoid having reflections from the inner sides of the slots, and so that the slots can be made straight and true to avoid differences in brilliance which would be caused otherwise by defects in the edges and which would give curved aberrant lines when viewed.

As an example of a suitable shutter design and speed, I have obtained very satisfactory results with a shutter having 24 slots 2 degrees wide, rotating at 120 r.p.m.

In operation, the optical device is used in its ordinary and usual manner. However, the rotating shutter will periodically shut out the image. This shutting out of the image will not be apparent, except for an apparent dimming, due to persistence of the image on the retina. However, shimmer will be substantially reduced because of the fact that the atmospheric turbulences which cause shimmer are of only short duration, and when the continuity of these turbulences is interrupted by the shutter, most of them, I have found, become substantially imperceptible. Therefore, as an example, if a shutter having 48 degrees of arc of open slots is rotated, the image will actually be visible only during 48/360, or 13⅓% of the time of viewing. I have found that at 120 r.p.m., with 24—2 degree slots, shimmer is reduced by close to 85% of that seen without use of my image stabilizer, since the motion of each point, which was visible without my image stabilizer, and which was caused by turbulent motion of the fluid medium carrying the light rays, is now not visible. Instead, a point will be seen first in one position then in another, but since the observed motion of the point is broken up or interrupted by my shutter, the motion is not perceived by the eye, and the points on the object viewed which are out of place when they are seen are not noticed by the eye.

Perhaps an analogous example might clarify my explanation. If we consider a riffle-type motion picture device of the type which was once common in amusement parks, or which is also known in the form of a small pad of pictures which may be riffled by hand, then it can be seen that a stationary scene may be depicted on the device by having all of the pictures alike. Now if one part of the scene is to go through a distorting motion, say an apple is to expand, then the apple will be shown larger and larger on successive pictures to give the impression of expanding. Now, suppose that 85% of these pictures of the expanding apple are removed at random. Then, as the picture are riffled, only a few—15%—of the pictures of the apple in expanded form will be seen. No impression of motion will be received by the viewer. Rather, he may notice only several momentary images of enlarged apples. Where continuous motion is not present, the observer will be aware of these images, if at all, only as momentary aberrations, particularly if, in between the aberrations, he sees the scene correctly depicted.

Now under conditions of "poor seeing," all parts of a viewed object will appear, without my image stabilizer, to be in motion, to shimmer. But if the image is periodically interrupted by my image stabilizer, and the apparent motion thus broken up, a clearer and steadier image is seen. Actually, under average "poor seeing" conditions, I estimate that only about 10% of the area of the object viewed is in apparent motion at any one time. The remaining 90% of the area of the object is usually seen in correct position. Thus, my image stabilizer interrupts the apparent motion of the aberrant 10% of the view, and between interruptions the image cast on the retina is substantially a correct image—with some aberrant points, but with the aberrant motion not perceived. I believe that this is the explanation of how my device works. At any rate, in practice, it has been found to work exceedingly well in reducing shimmer.

Another useful application of my shuttering device is of special use in viewing the earth's moon with a celestial telescope, or in making other observations in which the object viewed is of considerable brightness. Observing the sun might be another example. This is the dimming effect which can be achieved with my device.

Today, with manned or instrumented flight to the moon an actual realizable possibility, there has been much interest in close and careful observation of the surface of the earth's moon, and intensive work is in progress, both among professional and amateur astronomers, to accurately map this surface. The surface, for this purpose particularly, is best observed with a telescope of high resolving power. These telescopes have large diameters, usually, and to make them easier to handle, they have shorter focal ratios. Shorter focal ratios give a brighter image. Frequently, such an image is too bright, and is a source of discomfort and inconvenience to the astronomer making the observations. The effect, upon looking away from the eyepiece is similar to the experience of facing a bright headlamp. Upon looking away, night vision is gone, and a period of near-blindness, and some discomfort ensues. My invention may also, besides being used to reduce shimmer, be utilized to reduce this glare, by producing the effect of dimming the image. This dimming effect takes place whenever my invention is used. For instance, in the example given previously, with a shutter having 48 degrees of arc of openings, 13⅓% of the light coming through the objective lens reaches the eye, while substantially 86⅔% is absorbed by the black shutter disc and the black interior parts of the telescope tube. In the example given, brilliance is reduced by approximately 85%, the same amount as shimmer. I have found in practice, that the apparent brightness is only very little reduced due to the fact that the pupil of the eye of the observer opens an additional amount when the image is dimmed, but viewing is considerably more comfortable, and the effect of temporary blindness upon looking away from the eyepiece is considerably less pronounced. If my shutter is designed primarily for dimming, almost any amount of dimming may be obtained. For example, a shutter with only two slots, each 1½ degree of arc in width were used, the shutter being rotated rapidly enough to give a non-flickering image, then the brightness of the object viewed would be, effectively, 3/360 of the brightness without such a shutter, or .8⅓ percent of such brightness, and, conceivably, a telescope equipped with such a shutter could be used to observe the sun when rotated at approximately 1500 r.p.m., if used in conjunction with approved sun filters, so as to bring the visible and invisible rays within proper safety limits. The precautionary use of such sun filters is, of course, essential for the sake of safety.

I would like to point out that dimming can be accomplished with diaphragms, but this reduces the effective size of the telescope objective and therefore reduces its resolving power. For this reason Herschel wedges are frequently used to produce dimming, but the proper adjustment of this device is difficult to accomplish, and the device does not therefore lend itself to easy removal when it is desired to use the telescope for viewing a less brilliant object.

What I claim is:

1. A shuttering device for high power long distance and astronomical telescopes having an objective system producing a real image and an ocular system for observing said real image, comprising a rotary shutter having a plurality of equally spaced narrow slots providing a total opening area of approximately 48° of arc of openings, mounting means for said shutter on said telescope whereby said shutter is rotatably mounted substantially at the real image plane of said telescope, and drive means for said shutter adapted to drive said shutter at approximately 120 revolutions per minute, whereby shimmer of said real image is reduced by intermittently cutting off said real image from an observer using said ocular system for observing said image.

2. The device of claim 1 wherein said slots are of trapezoidal cross-section to reduce reflections from the slot walls.

References Cited in the file of this patent

UNITED STATES PATENTS

| | | |
|---|---|---|
| 1,153,945 | Mustin | Sept. 21, 1915 |
| 1,408,386 | Newton | Feb. 28, 1922 |
| 1,807,149 | Butler et al. | May 26, 1931 |
| 2,581,459 | Tyra | Jan. 8, 1952 |

FOREIGN PATENTS

| | | |
|---|---|---|
| 151,747 | Austria | Nov. 25, 1937 |
| 358,125 | Italy | Apr. 7, 1938 |
| 394,285 | Great Britain | June 22, 1933 |
| 485,152 | Great Britain | May 16, 1938 |